US008989400B2

(12) United States Patent
Chiu et al.

(10) Patent No.: US 8,989,400 B2
(45) Date of Patent: Mar. 24, 2015

(54) WIRELESS HEADSET AND METHOD FOR SEARCHING MATCHED DEVICE

(75) Inventors: Hsiao-Ping Chiu, New Taipei (TW); Hsueh-Tsen Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 257 days.

(21) Appl. No.: 13/545,907

(22) Filed: Jul. 10, 2012

(65) Prior Publication Data

US 2013/0156217 A1 Jun. 20, 2013

(30) Foreign Application Priority Data

Dec. 14, 2011 (TW) ................................ 100146197

(51) Int. Cl.
*H04B 5/00* (2006.01)
*H04B 7/00* (2006.01)
*H04R 1/10* (2006.01)

(52) U.S. Cl.
CPC ........ *H04R 1/1041* (2013.01); *H04R 2201/107* (2013.01); *H04R 2420/09* (2013.01)
USPC ........................................... 381/79; 455/41.2

(58) Field of Classification Search
CPC ............... H04R 1/1041; H04R 1/1066; H04R 2201/107; H04R 2420/07; H04R 2420/09
USPC ............. 381/309, 74, 77, 79; 455/41.2, 41.3, 455/432.1
See application file for complete search history.

(56) References Cited

U.S. PATENT DOCUMENTS

| | | | | |
|---|---|---|---|---|
| 2006/0214044 | A1* | 9/2006 | Chiang | 242/378 |
| 2010/0308999 | A1* | 12/2010 | Chornenky | 340/573.1 |
| 2012/0040617 | A1* | 2/2012 | Hsia et al. | 455/41.3 |
| 2012/0171964 | A1* | 7/2012 | Tang et al. | 455/41.3 |
| 2013/0012055 | A1* | 1/2013 | Stenmark et al. | 439/490 |

FOREIGN PATENT DOCUMENTS

| | | | |
|---|---|---|---|
| CN | 1937438 | A | 3/2007 |
| CN | 101536434 | A | 9/2009 |
| TW | 200524362 | A1 | 7/2005 |

* cited by examiner

*Primary Examiner* — Ping Lee
(74) *Attorney, Agent, or Firm* — Novak Druce Connolly Bove + Quigg LLP

(57) ABSTRACT

A wireless headset includes a wireless module, a headset body and a universal serial bus (USB) connector, the headset body includes a light sensor located on an end of the headset body, and the USB connector includes a plug and a connection line. The connection line is located on a first end of the USB connector and connected to the headset body, the plug is located on a second end of the USB connector, and the plug of the USB connector is connectable to the end of the headset body.

7 Claims, 10 Drawing Sheets

WIRELESS HEADSET AND METHOD FOR SEARCHING MATCHED DEVICE

BACKGROUND

1. Technical Field

Embodiments of the present disclosure relate to a wireless communication technology, and particularly to a wireless headset and method for searching a matched device corresponding to the wireless headset.

2. Description of Related Art

One method for searching a matched device of a wireless headset (e.g., a BLUETOOTH headset) is illustrated as follows. First, a user powers on the wireless headset. Second, the user presses a specified key for a preset time (e.g., five seconds) to start a matching mode of the wireless headset. Third, the user releases the specified key. Fourth, the wireless headset searches for a matched device, such as a mobile phone or a computer. These kinds of manual operations are inefficient and inconvenient for the user. Therefore, there is room for improvement in the art.

DETAILED DESCRIPTION

All of the processes described below may be embodied in, and fully automated via, functional code modules executed by one or more general purpose electronic devices or processors. The code modules may be stored in any type of non-transitory computer-readable medium or other storage unit. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
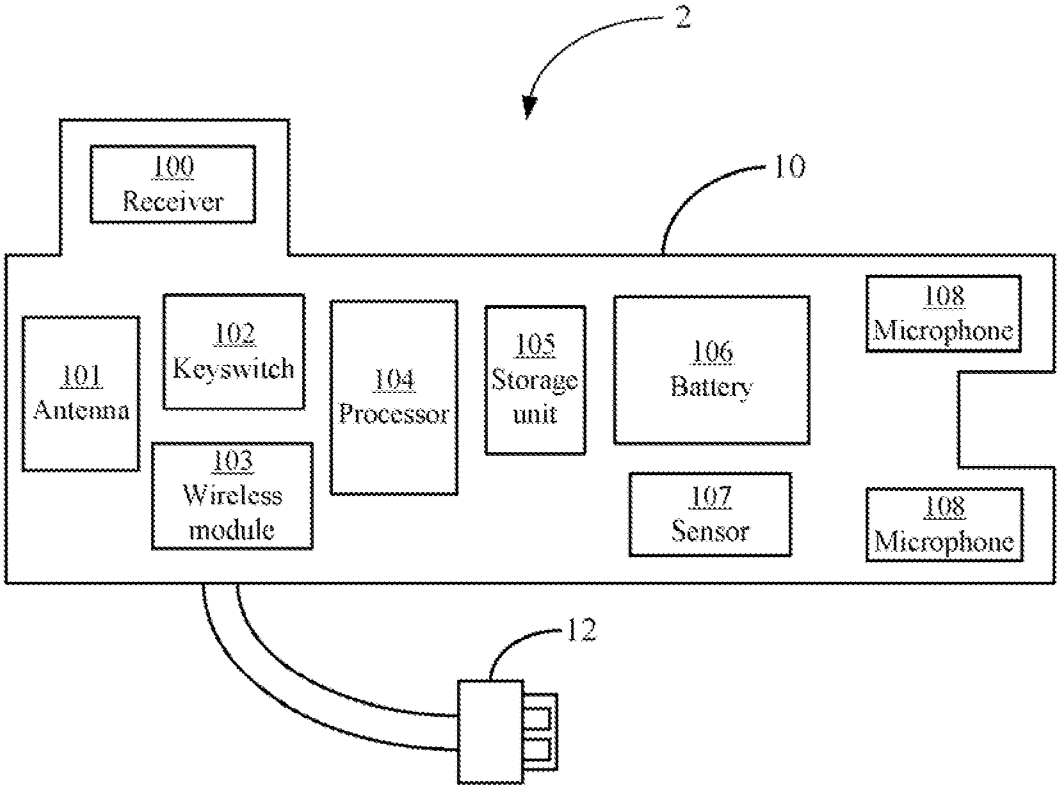
FIG. 1 is a schematic diagram of one embodiment of a wireless headset in a two dimensional (2D) view.
Figure 2:
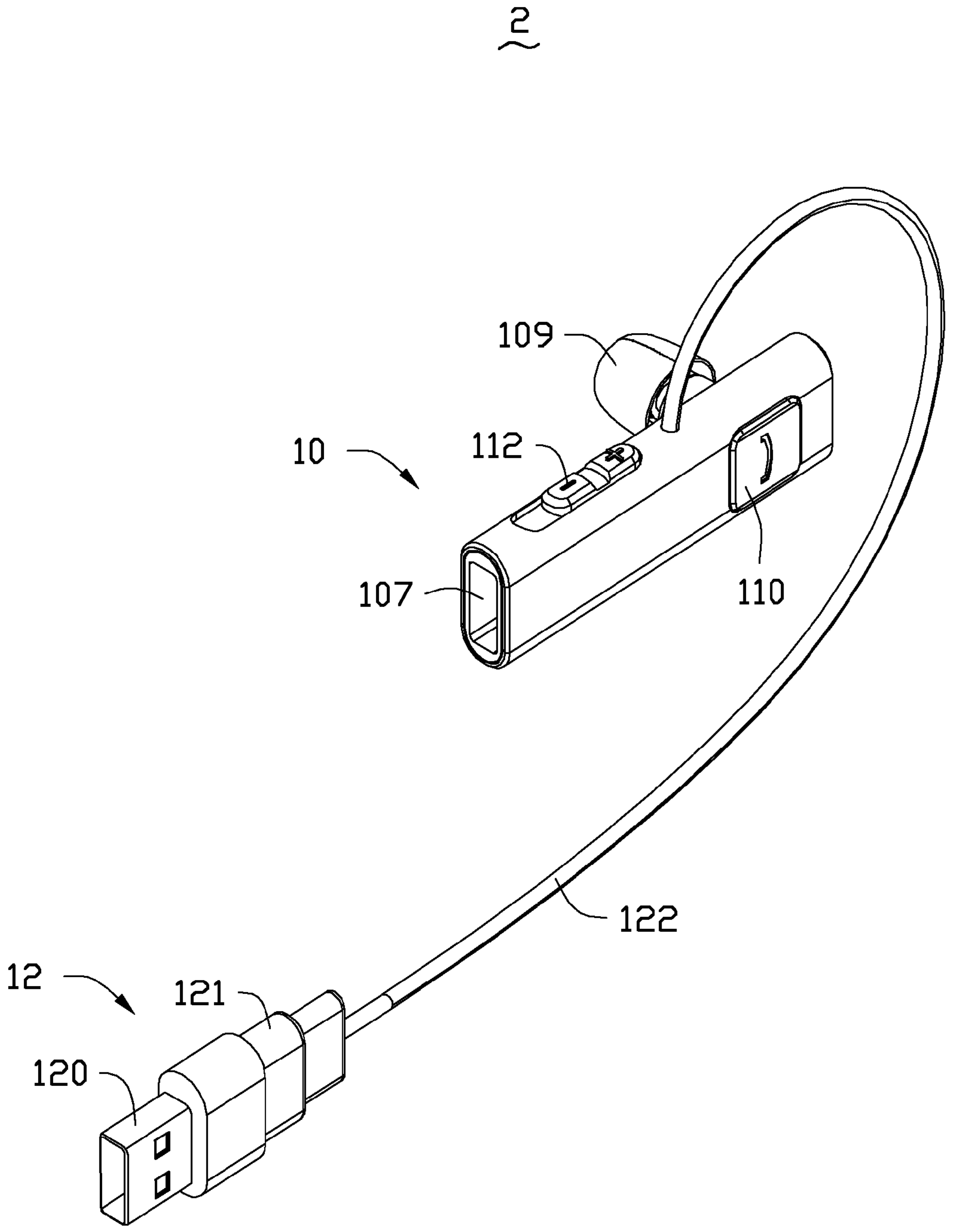
FIG. 2 is a schematic diagram of one embodiment of the wireless headset in a three dimensional (3D) view.

Referring to FIG. 1 and FIG. 2, FIG. 1 is a schematic diagram of one embodiment of a wireless headset 2 in a two dimensional (2D) view, and FIG. 2 is a schematic diagram of one embodiment of the wireless headset 2 in a three dimensional (3D) view. The wireless headset 2 (e.g., a BLUETOOTH headset) includes a headset body 10 and a universal serial bus (USB) connector 12. The headset body 10 includes, but is not limited to, a receiver 100, an antenna 101, a key switch 102, a wireless module 103, a processor 104, a storage unit 105, a battery 106, a sensor 107, one or more microphones 108, an earplug 109, a hang on/hang up switch 110, and a volume switch 112. It should be understood that FIG. 1 or FIG. 2 illustrates only one example of the wireless headset 2 that may include more or fewer components than illustrated, or have a different configuration of the various components in other embodiments.

In one embodiment, the wireless module 103 may be the BLUETOOTH module. The storage unit 105 may be an electrically erasable programmable read-only memory (EEPROM), such as a flash memory. The battery 106 is used to provide power for the wireless headset 2. The sensor 107 may be a light sensor which is located on a first end of the headset body 10. The light sensor is a mechanical or electronic device that detects light. If the sensor 107 is not covered by, such being covered by a plug 120 of the USB connector 12, light is detected by the sensor 107. If the sensor 107 is covered (e.g., covered by the plug 120 of the USB connector 12 as when the plug 120 is connected to the first end of the headset body 10), the sensor 107 does not detect light, and a control signal is generated and sent to the processor 104, so that the processor 104 controls the wireless headset 2 to search for a matched device. In other embodiments, the sensor 107 may be located on other suitable locations (e.g., a side wall) of the headset body 10.

Figure 4A:
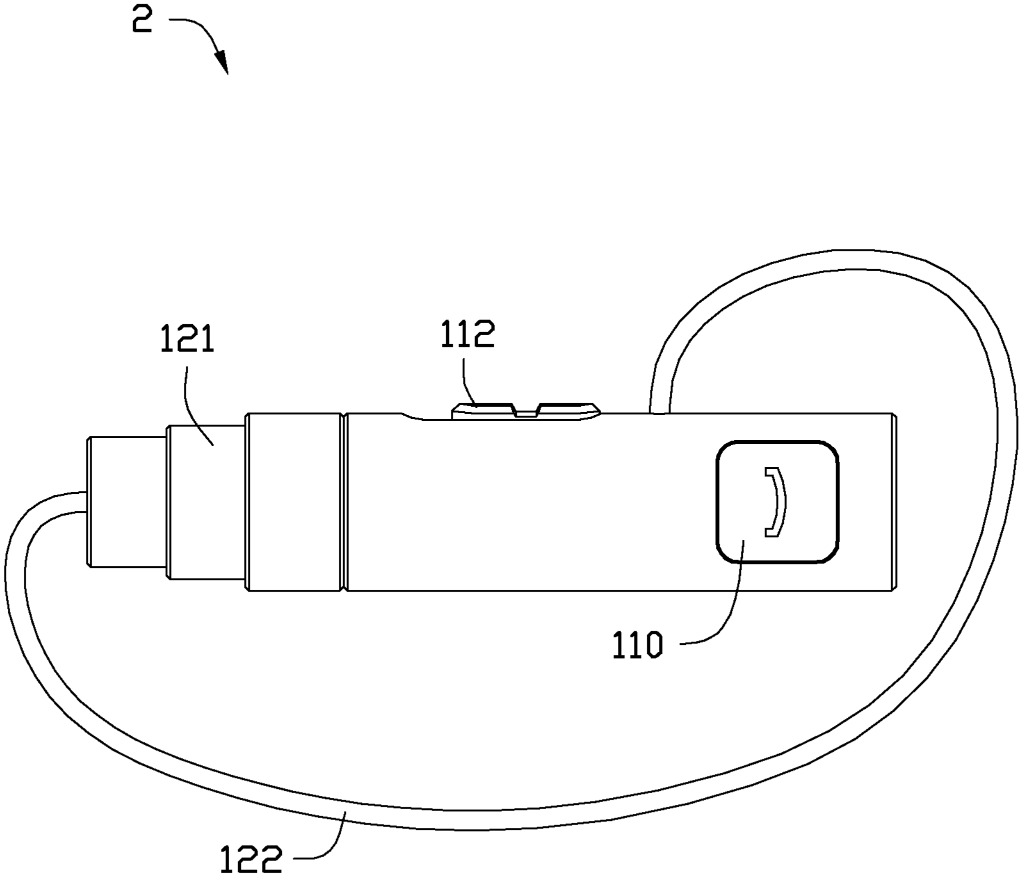
FIGS. 4A-4C are schematic diagrams of one embodiment of moveable connections between the headset body of the wireless headset and a slip part of the USB connector.
Figure 4B:
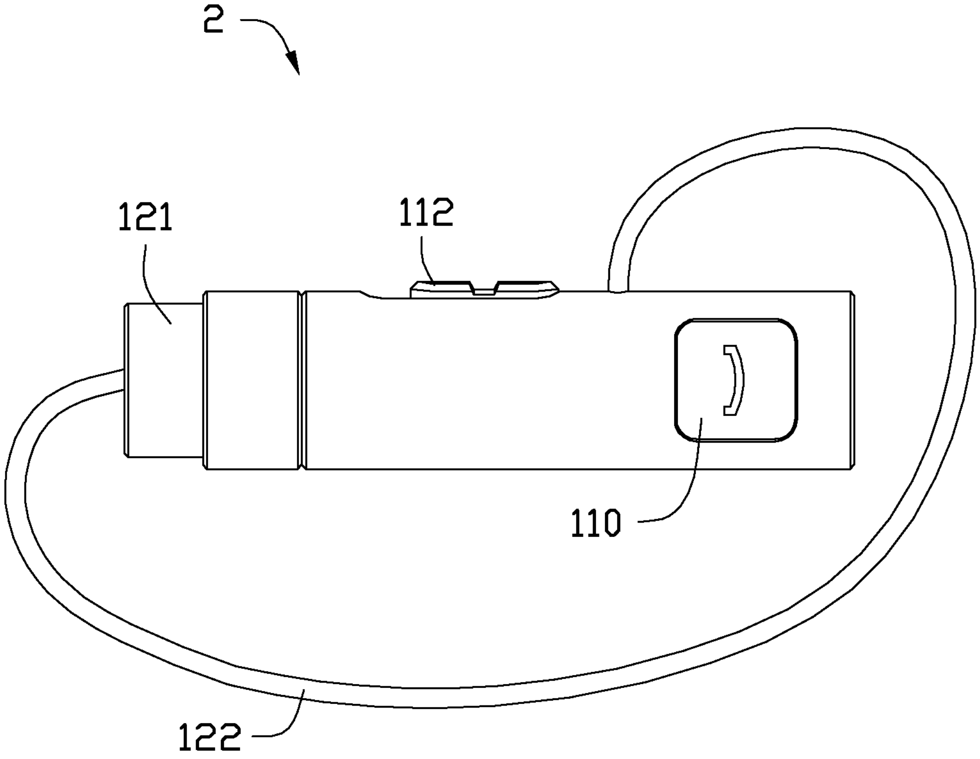
Figure 4C:
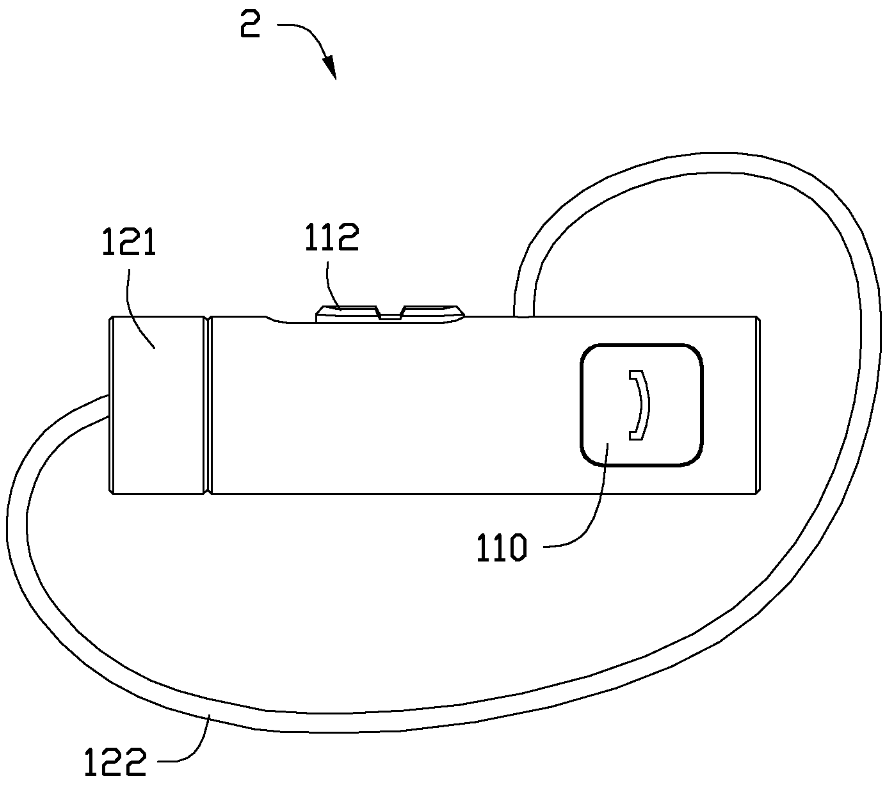

The USB connector 12 includes, but is not limited to, the plug 120, a slip part (e.g., a telescopic tube) 121, and a connection line (e.g., an elastic loop) 122. A first end of the connection line 122 is connected to a first end of the slip part 121, a second end of the connection line 122 is connected to the headset body 10 (e.g., a side wall of the headset body 10). A second end of the slip part 121 is connected to a first end of the plug 120. The slip part 121 is moveable so that the wireless headset 2 can be put in the ear of a user. Examples of movable connections between the headset body 10 and the slip part 121 are shown in FIGS. 4A-4C.

Figure 3A:
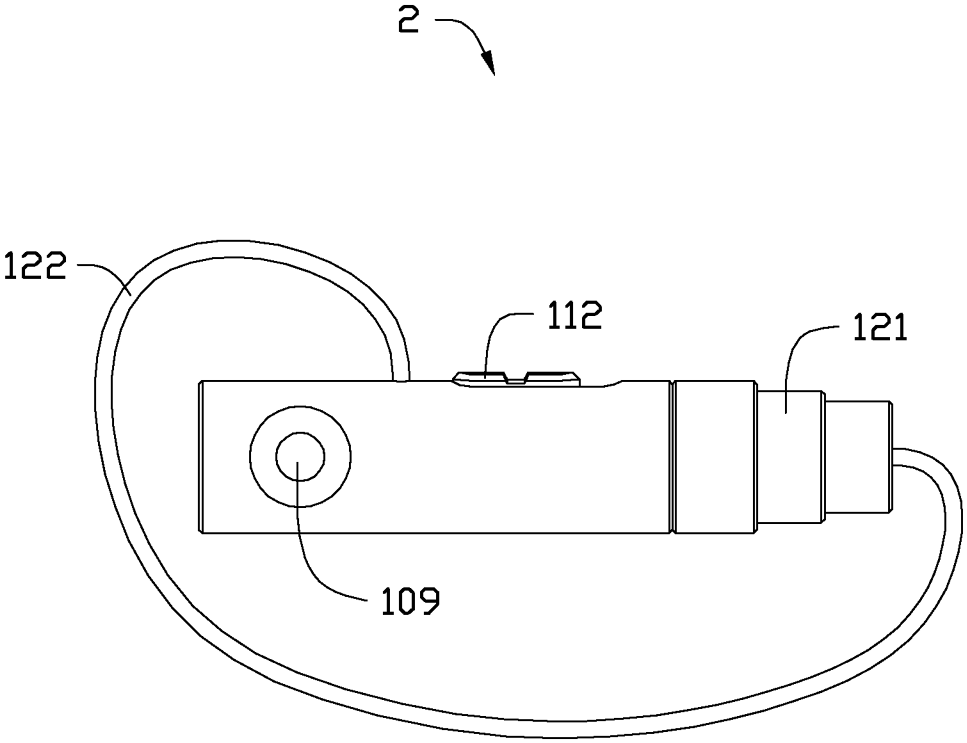
FIGS. 3A-3B are schematic diagrams of one embodiment of a connection between a headset body of the wireless headset and a USB connector.
Figure 3B:
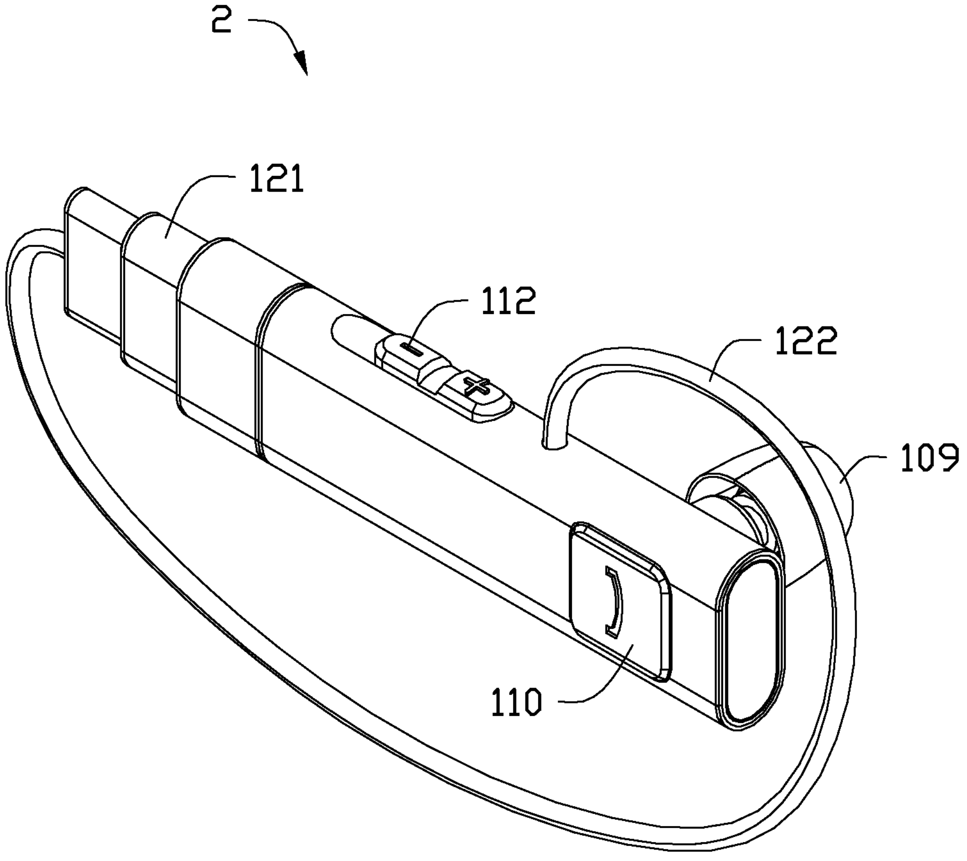

As shown in FIG. 3A and FIG. 3B, a second end of the plug 120 is connected to the first end of the headset body 10, so that the headset body 10 and the USB connector 12 are connected together. The sensor 104 generates a control signal in response to the connection, and sends the control signal to the processor 104. The processor 104 controls the wireless headset 2 to enter a matching mode, which is used to search for a matched device. In one embodiment, the matched device is a paired device corresponding to the wireless headset 2. An example of the matching mechanism is as follows. Each device must enter a personal identification number (PIN) code, and matching is successful if both devices enter the same PIN code. Any 16-byte UTF-8 string or other fixed string may be used as a PIN code. In one example, the wireless headset 2 uses BLUETOOTH (BT) to search for matched devices also using BT. If the wireless headset 2 finds a matched device using BT and also has the same PIN code, then it can be considered as a matched device.

In other embodiments, the slip part 121 may be removed from the USB connector 12. In this situation, a first end of the USB connector 12 is connected to the headset body 10 through the connection line 122, and a second end of the USB connector 12 is connected to the first end of the headset body 10 through the plug 120.

In one embodiment, the headset body 10 may include computerized instructions in the form of one or more programs that are executed by the processor 104 and stored in the storage unit 105 (or memory).

Figure 5:
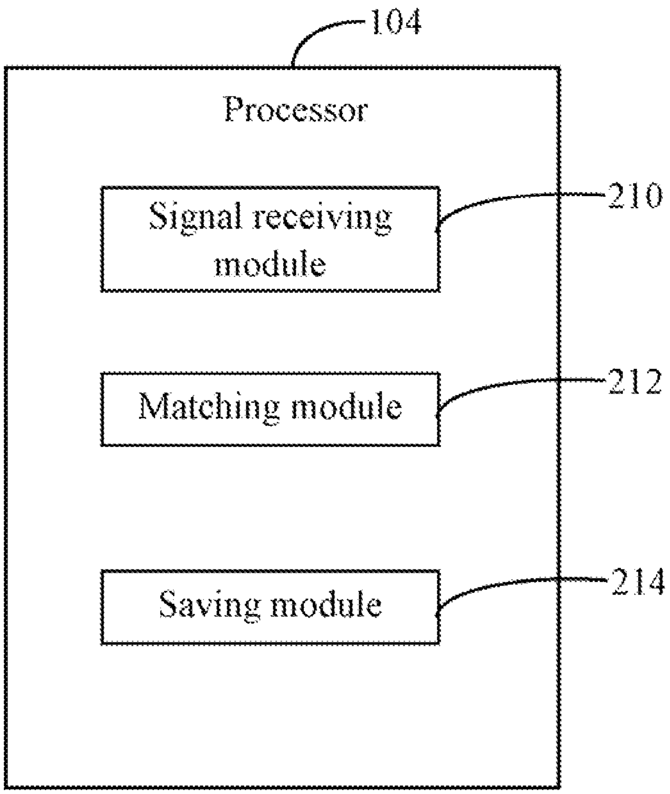
FIG. 5 is a block diagram of function modules executed by a processor of the headset body.

FIG. 5 is a block diagram of function modules executed by the processor 104 of the headset body 10. In one embodiment, the headset body 10 may include one or more modules, for example, a signal receiving module 210, a matching module 212, and a saving module 214. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 6:
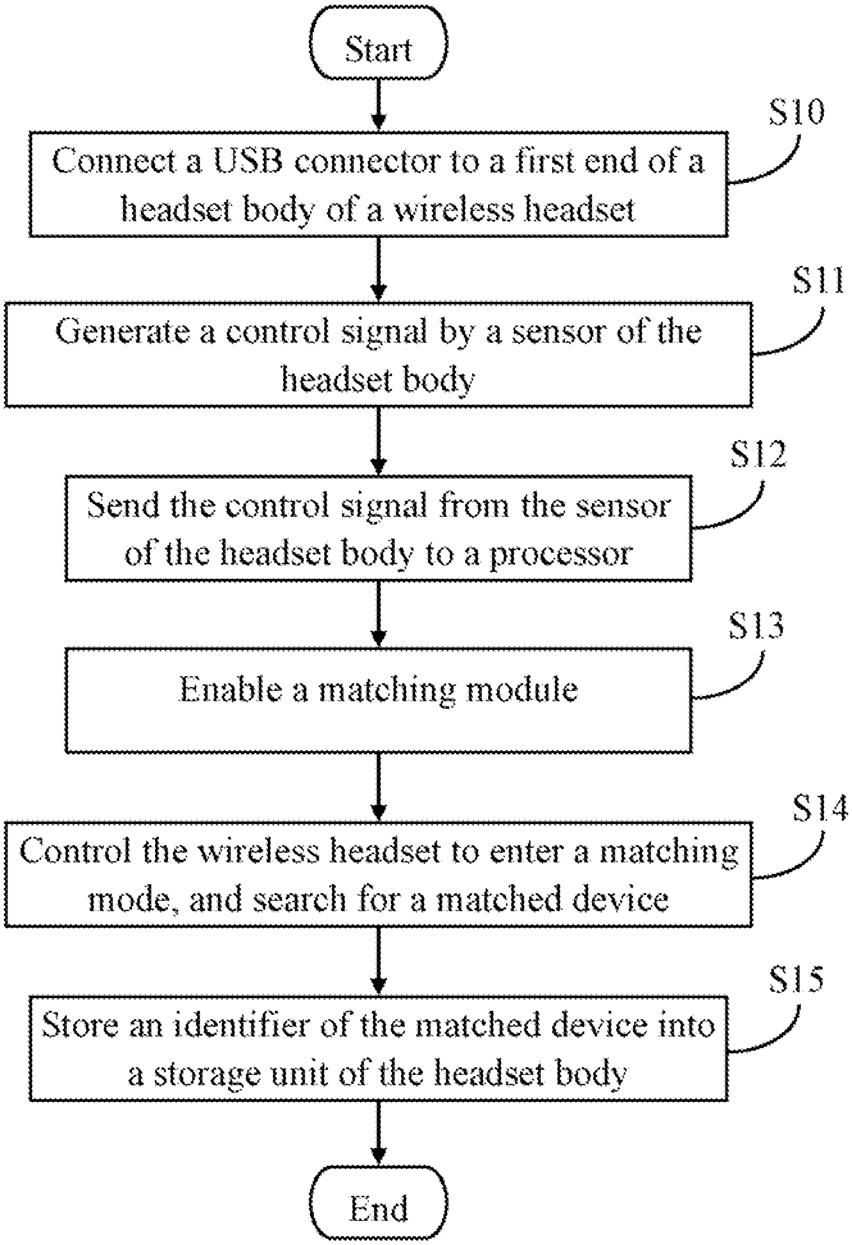
FIG. 6 is a flowchart of one embodiment of a method for searching for a matched device corresponding to the wireless headset.
Figure 7:
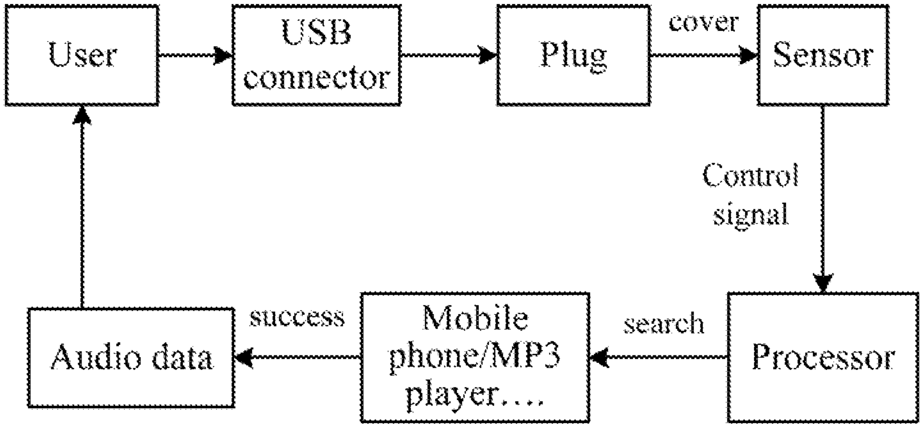
FIG. 7 is a block diagram of an example of the flowchart of FIG. 6 in another expression mode.

FIG. 6 is a flowchart of one embodiment of a method for searching for a matched device corresponding to the wireless headset 2. Depending on the embodiment, additional steps may be added, others removed, and the ordering of the steps may be changed. Another expression mode of the flowchart of FIG. 6 is shown in FIG. 7.

In step S10, the USB connector 12 is connected to the headset body 10 of the wireless headset 2 by the user. In details, the user connects the plug 120 of the USB connector 12 to the first end of the headset body 10.

In step S11, the sensor 107 generates a control signal in response to the USB connector 12 being connected to the first end of the headset body 10.

In step S12, the sensor 107 sends the control signal to the processor 104 of the headset body 10.

In step S13, the signal receiving module 210 receives the control signal, and enables the matching module 212 of the headset body 10.

In step S14, the matching module 212 controls the wireless headset 2 to enter a matching mode, and searches for a matched device, such as a mobile phone or a MP3 player. MP3 refers to MPEG-1 or MPEG-2 audio layer three. When the matching is successful, the matched device sends an acknowledgement signal to the wireless headset 2.

In step S15, the saving module 214 stores an identifier (e.g. a PIN code) of the matched device into the storage unit 105 of the headset body 10, so that the matched device can be obtained from the storage unit 105 directly at a next time. In other embodiments, the USB connector 12 may be used to charge up the headset body 10 of the wireless headset 2 by connecting the USB connector 12 to a charging equipment (i.e., a charger).

An example of the flowchart of FIG. 6 is shown in FIG. 7. When the user connects the plug 120 of the USB connector 12 to the first end of the headset body 10, the sensor 107 of the headset body 10 is covered by the plug 120, and a control signal is sent to the processor 104. The processor 104 searches for a matched device, such as a mobile phone or a MP3 player. If the matched device has been found, audio data of the matched device are received by the user.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A wireless headset, comprising:

a wireless module;

a headset body comprising a light sensor, the light sensor located on an end of the headset body;

a universal serial bus (USB) connector comprising a plug and a connection line, the connection line located on a first end of the USB connector and connected to the headset body, the plug located on a second end of the USB connector, and the plug of the USB connector being connectable to the end of the headset body;

wherein the sensor is covered by the plug of the USB connector when the plug of the USB connector is connected to the first end of the headset body, and generates a control signal to control the wireless headset to enter a matching mode for searching a matched device.

2. The wireless headset according to claim 1, wherein the USB connector further comprises a slip part, a first end of the slip part is connected to the connection line, and a second end of the slip part is connected to the plug.

3. The wireless headset according to claim 2, wherein the slip part is a telescopic tube, and the connection line is an elastic loop.

4. A method of a wireless headset for searching for a matched device corresponding to the wireless headset, the wireless headset comprising a headset body and a universal serial bus (USB) connector, the headset body comprising a light sensor, and the USB connector comprising a plug and a connection line, the method comprising:

receiving notification that the plug of the USB connector is connected to an end of the headset body, and generating a control signal by the light sensor, the light sensor located on the end of the headset body, wherein the sensor is covered by the plug of the USB connector when the plug of the USB connector is connected to the end of the headset body;

sending the control signal to a processor of the headset body;

controlling the wireless headset to enter a matching mode for searching a matched device according to the control signal; and storing an identifier of the matched device into a storage unit of the headset body.

5. The method according to claim 4, wherein the USB connector further comprises a slip part, a first end of the slip part is connected to the connection line, and a second end of the slip part is connected to the plug.

6. The method according to claim 5, wherein the slip part is a telescopic tube, and the connection line is an elastic loop.

7. The method according to claim 4, wherein the identifier of the matched device is a personal identification number (PIN) code of the matched device.

* * * * *